United States Patent [19]
Fanning et al.

[11] Patent Number: 5,382,860
[45] Date of Patent: Jan. 17, 1995

[54] ELECTROMAGNETIC PUMP STATOR CORE

[75] Inventors: Alan W. Fanning, San Jose; Eugene E. Olich, Aptos; Leslie R. Dahl, Livermore, all of Calif.

[73] Assignee: General Electric Company, San Jose, Calif.

[21] Appl. No.: 3,994

[22] Filed: Jan. 15, 1993

Related U.S. Application Data

[63] Continuation-in-part of Ser. No. 836,475, Feb. 18, 1992, Pat. No. 5,195,231.

[51] Int. Cl.$^6$ .............................................. H02K 1/00
[52] U.S. Cl. .................................. 310/216; 310/214; 310/217; 310/259
[58] Field of Search .................... 310/42, 91, 216, 217, 310/214, 254, 259, 271

[56] References Cited

U.S. PATENT DOCUMENTS

| | | | |
|---|---|---|---|
| 4,212,592 | 7/1980 | Olich et al. | 417/50 |
| 4,508,677 | 4/1985 | Craig | 376/174 |
| 4,859,885 | 8/1989 | Kliman et al. | 310/11 |
| 4,882,514 | 11/1989 | Brynsvold et al. | 310/208 |
| 5,195,231 | 3/1993 | Fanning | 29/596 |

Primary Examiner—R. Skudy
Attorney, Agent, or Firm—J. S. Beulick

[57] ABSTRACT

A stator core for supporting an electrical coil includes a plurality of groups of circumferentially abutting flat laminations which collectively form a bore and perimeter. A plurality of wedges are interposed between the groups, with each wedge having an inner edge and a thicker outer edge. The wedge outer edges abut adjacent ones of the groups to provide a continuous path around the perimeter.

14 Claims, 8 Drawing Sheets

ELECTROMAGNETIC PUMP STATOR CORE

The U.S. Government has rights in this invention in accordance with Contract No. DOE DE-AC03-89SF17445 awarded by the Department of Energy.

The present invention is a continuation-in-part of application Ser. No. 07/836,475, filed Feb. 18, 1992 now U.S. Pat. No. 5,195,231, by A. W. Fanning et al, entitled "Method For Producing Inner Stators For Electromagnetic Pumps."

CROSS REFERENCE TO RELATED APPLICATION

The present invention is related to application Ser. No. 08/006,276, filed concurrently herewith, by A. W. Fanning et al, entitled "Laminated Electromagnetic Pump Stator Core.

This invention is concerned with an improvement in annular linear flow electromagnetic induction pumps such as the type commonly used to circulate electrically conducting liquid metal coolant through a liquid metal cooled nuclear fission reactor plant. Such coolant circulating pumps and liquid metal cooled nuclear fission reactors, and their operation or function in this service are disclosed in U.S. Pat. No. 4,508,677, issued Apr. 2, 1985, for example.

BACKGROUND OF THE INVENTION

Annular linear flow electromagnetic induction pumps for impelling liquid metals generally comprise an annular flow channel or duct which is surrounded by a column composed of a multiplicity of alternating annular stator coils and magnetic stator iron. This type of electromagnetic pump, commonly known as a single stator, annular linear flow induction pump, and its use in a liquid metal cooled nuclear fission reactor, is disclosed in U.S. Pat. Nos. 4,859,885, issued Aug. 22, 1989, and 4,882,514, issued Nov. 21, 1989.

However, a more versatile linear flow electromagnetic induction pump design than those shown in the above patents comprises a double stator system. This electromagnetic pump system comprises the single stator arrangement as shown in the aforesaid patent, which is additionally provided with a second or inner stator arrangement concentrically contained and enclosed within the pump's central linear liquid flow duct or channel. A second stator column is also composed of a multiplicity of alternating annular stator coils and stator iron. In combination, the outer and inner, or double stators act upon the liquid linearly passing through the annular flow duct.

This double stator arranged pump design provides greater pumping capacity per pump unit size, or alternatively equal capacity provided by a smaller pump unit. Accordingly the double stator pump has the advantages of greater efficiency and versatility, among others.

The disclosures and contents of U.S. Pat. Nos. 4,508,677, 4,859,885 and 4,882,514, are incorporated herein by reference.

SUMMARY OF THE INVENTION

A stator core for supporting an electrical coil includes a plurality of groups of circumferentially abutting flat laminations which collectively form a bore and perimeter. A plurality of wedges are interposed between the groups, with each wedge having an inner edge and a thicker outer edge. The wedge outer edges abut adjacent ones of the groups to provide a continuous path around the perimeter.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
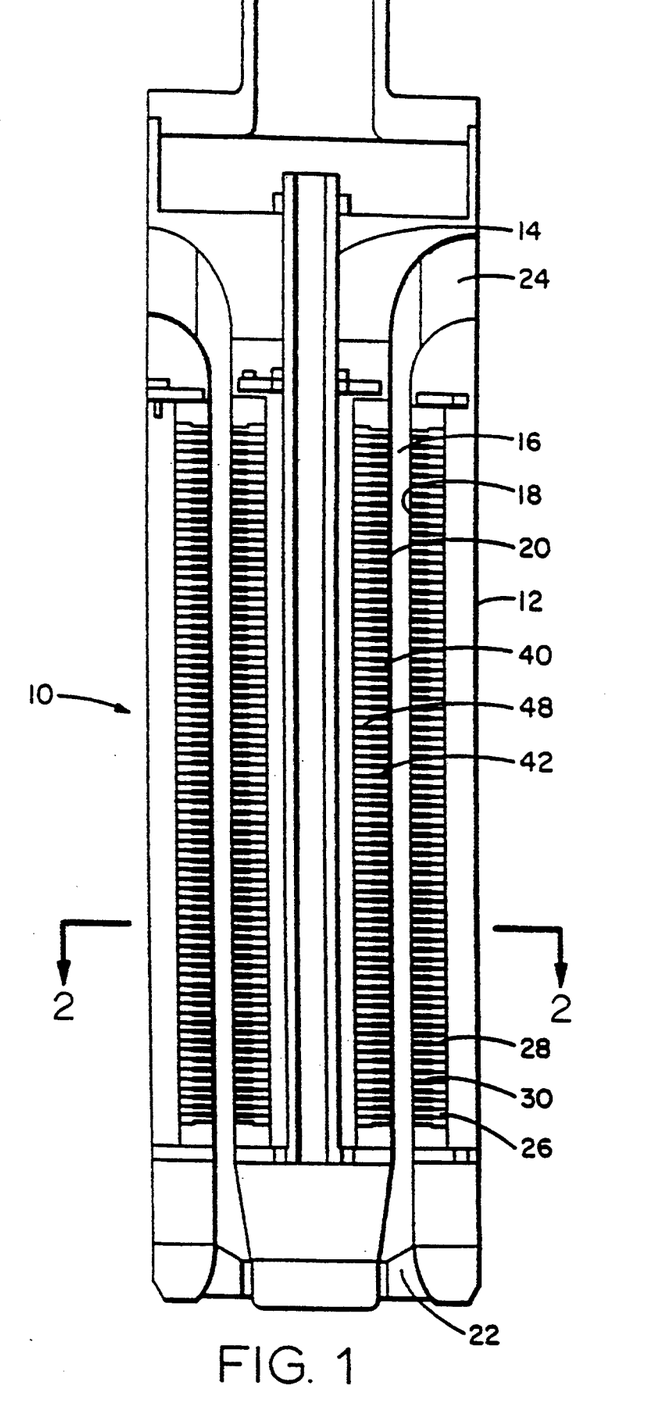
FIG. 1 is a view, part in section, of a double stator annular linear flow electromagnetic pump.
Figure 2:
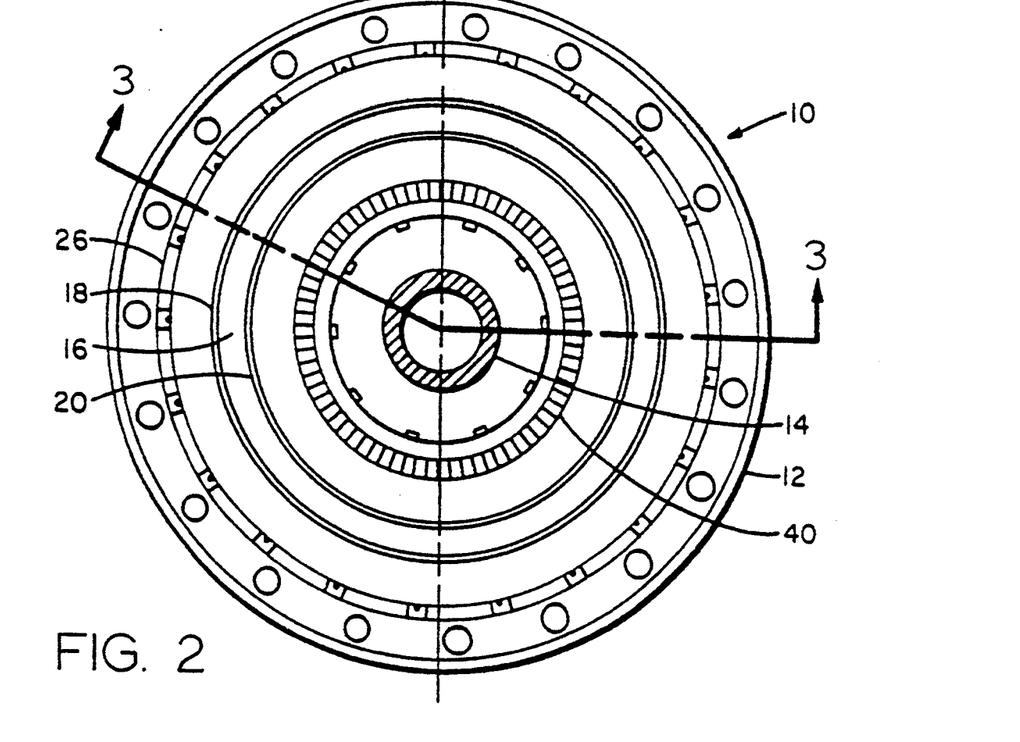
FIG. 2 is a cross-sectional view of the double stator annular linear flow electromagnetic pump of FIG. 1, taken along line 2—2.
Figure 3:
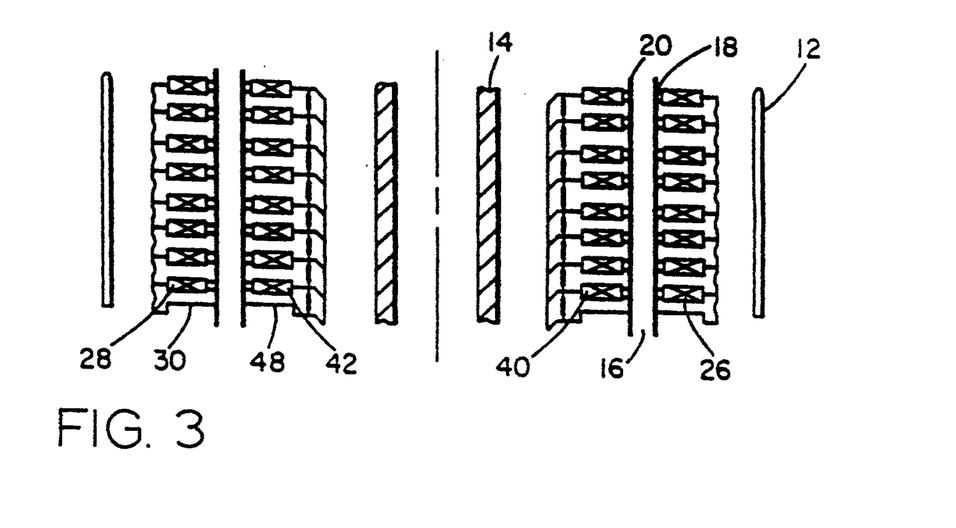
FIG. 3, is a partial cross-sectional view of the double stator assembly of the annular linear flow electromagnetic pump of FIG. 2 taken along line 3—3.

Referring to the drawings, in particular FIGS. 1, 2 and 3, a double stator annular linear flow, electromagnetic induction pump 10, for service in electrically conducting liquid systems, typically comprises the following assemblage of components: Pump housing 12, commonly a cylindrical unit, encloses the electromagnetic induction system and provides the necessary protection to enable the pump to operate submerged within the aggressive environment of liquid sodium metal commonly utilized as the coolant medium in liquid metal cooled nuclear fission reactors. A pump assembly inner stator 40 is secured and supported by means of a central support post 14.

The double stator electromagnetic pumps 10 which are the subject of this invention contain an annular flow channel 16 for magnetically impelling the passage of liquid metal therethrough. Annular flow channel 16 is defined by an outer flow conduit 18 and a concentric smaller inner flow conduit 20. An inlet 22 provides entry to the annular flow channel 16, and outlet 24 provides for discharge therefrom, whereby the induced linear flow of liquid metal through the pump 10 is effected, generally upwardly from the bottom inlet 22 to the top outlet 24.

An outer stator 26 comprises an annular column positioned between the pump housing 12 and the outer flow conduit 18, and extends circumferentially around the outside of conduit 18. Outer stator 26 can be generally conventional in design, comprising a multiplicity of alternately stacked annular stator units having stator magnetic iron outer cores 28 and stator outer coils 30. The stator coils 30 commonly consist of electrical conductor strips or ribbons of copper metal wound into a suitably sized and coiled unit and wrapped in electrical insulation. The coil terminals or power leads extend from the outer periphery of the outer coil 30. The stator magnetic cores 28 commonly include thin iron elements or laminations which are aligned side-by-side and laminated into composite units. The iron elements can be laminated into a continuous composite ring, or laminated into a number of individual composite units or packages which in turn are assembled together into a ring configuration.

In a conventional single stator electromagnetic pump as shown in U.S. Pat. No. 4,822,514, the stator iron cores 28 and stator coils 30 are alternately stacked superimposed upon each other forming a column surrounding the annular flow conduit 18 and provides the magnetic impelling linear flow channel. This single column of stator coils and iron cores external to the annular flow duct provides a pulsed liquid metal impelling force.

With a double stator annular linear flow electromagnetic pump to which this invention primarily applies, in addition to the foregoing outer stator 26 common to the single stator pump design, the inner stator 40 comprises an annular column positioned within the inner flow conduit 20 and located circumferentially within and surrounded by conduit 20. Inner stator 40, similar to the outer stator 26, typically consists of inner coils 42 of electrical conductor strips or ribbons of copper metal insulated and wound upon or within itself into suitably sized and coiled units having terminals or leads extending from inside the coils 42 as shown in FIG. 3. The inner stator 40 also includes stator iron inner rings or cores 48 as shown in FIG. 1 which have thin iron elements or laminations aligned side-by-side and laminated into a continuous composite ring. Inner stator coils 42 and stator iron cores 48 are alternately stacked superimposed upon each other, forming an annular column enclosed within and surrounded by the inner flow conduit 20. Coils 42 are insulated from the cores 48.

Although both the outer and inner stators 26, 40 are similarly built up or assembled from comparable components comprising alternately stacked conducting copper cods 30, 42 with insulated magnetic iron cores 28, 48 in an annular column, there remains significantly different circumstances or factors to cope with in their assembly and operation. For example, with the outer stator 26, the alignment of succeeding layers of coils 30 and cores 28 is assured by the fact that these annular components are installed around the outside of the cylindrical outer flow conduit 18. However, concerning the inner stator 40, the inner flow conduit 20 is external to the inner stator stack or column 40, and the conduit 20 is not installed around the stator unit until after it is assembled and its wiring completed in an exemplary procedure. Thus, alignment of the inner stator components is required.

Additionally, heat transfer from the outer and inner stators 26, 40 of a double stator, annular linear flow induction electromagnetic pump to the liquid metal impelled through the channel 16 is substantially dependent upon clearances existing at the stator-to-flow annulus duct interface. Namely, large gaps will reduce heat transfer and result in an increase in stator temperatures whereas smaller gaps will result in the opposite effect.

For outer stators, such as 26 in FIG. 1, the gap at the stator-to-flow conduit 18 interface is minimized by the advantageous condition that typical conduit materials, such as stainless steel, have a high thermal expansion coefficient and typical stator iron materials have a lower thermal expansion coefficient. Thus, as the pump is brought up to operating temperature, thermal growth of outer flow conduit 18 exceeds that of outer stator 26, ensuring a close fit at the interface.

However, regarding the inner stator 40 of double stator induction electromagnetic pumps, the use of the same or similar component materials of construction would result in the reverse situation, that is, the inner flow conduit 20 moving away from the inner stator iron core 48 as the pump 10 is brought up to operating temperature. Further complicating the occurrence is the requirement that the outer and inner flow conduits 18 and 20 be made of the same material to avoid significant differential thermal expansion between them whereby the size of the flow channel 16 through the pump would be subject to change. Therefore, there is a decided need to provide an inner stator design that minimizes the gap at the stator iron-to-flow conduit interface at pump operating temperatures.

The inner stator coils 42 have their electrical terminals or leads projecting inwardly from the inner coil 42 since the inner conduit 20 prevents access to the outer circumference of the inner coil 42. Preferably, both ends of the coil 42 are used to provide the terminals for connection to a power source. Moreover, the coils 42 are preferably produced by winding the strips or ribbons of copper or the like metal in two or more tiers or layers either by multiple windings or combining two or more tiers, one superimposed upon the other.

Unlike the outer stator iron core 28 where the iron ring, regardless of whether assembled of discrete composite units or packets of iron elements such as shown in the above U.S. Pat. No. 4,882,514, FIG. 3C for example, is continuous at its inside diameter, the inner stator iron rings 48 must be approximately continuous at their outside diameter. This requirement essentially eliminates the use of discrete composite units or packets of iron elements as heretofore commonly employed in the prior art.

Figure 4:
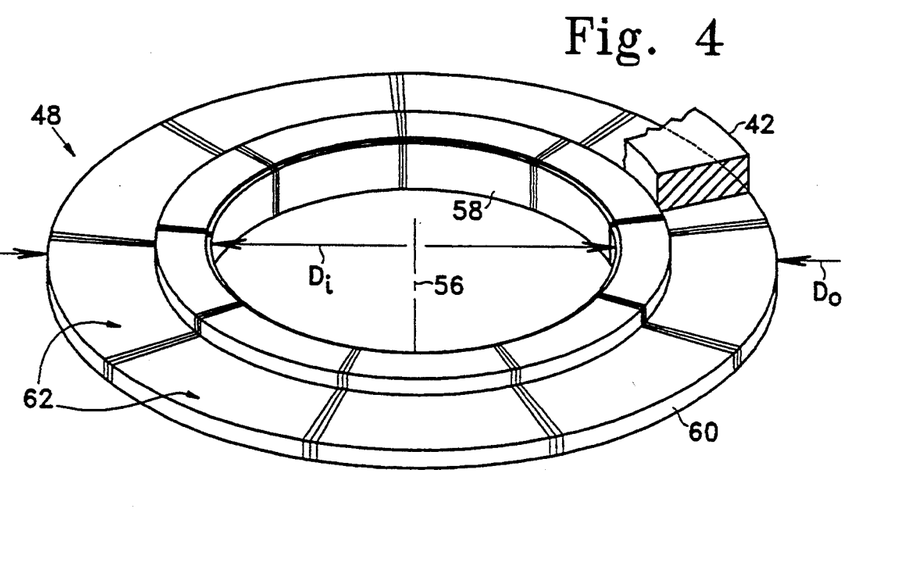
FIG. 4 is a perspective view of an exemplary iron stator core supporting stator coils, and having a plurality of abutting sectors.
Figure 5:
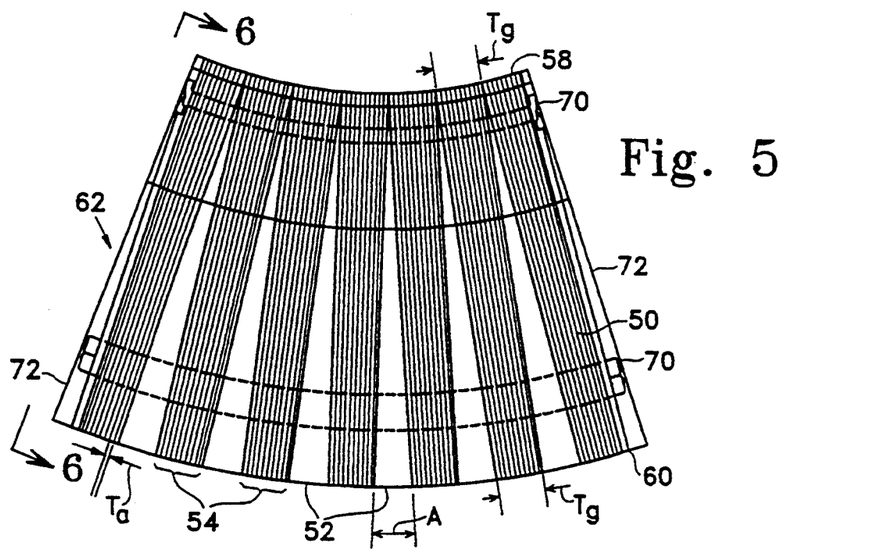
FIG. 5 is a top view of one of the sectors shown in FIG. 4 having groups of laminations separated by wedges.

In accordance with this invention, as shown in FIGS. 4 and 5, an inner stator iron continuous core 48 is fabricated by joining a multiplicity of iron elements 50, in leaf or lamination form, in an annular configuration or ring by means of a sufficient number of tapered or wedge shaped elements, i.e. wedges 52. The individual elements of the assembled ring are laminated together by suitable bonding means such as a ceramic adhesive, or mechanical devices as described hereinbelow.

Figure 6:
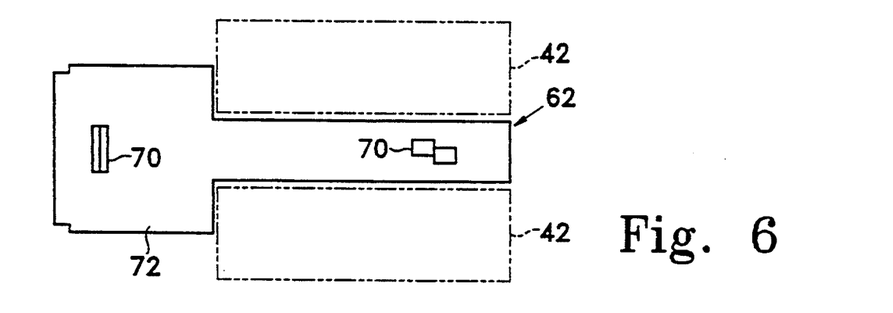
FIG. 6 is an end view of the sector shown in FIG. 5 and taken along line 6—6.

More specifically, in accordance with the present invention, the stator inner core 48 as shown in FIGS. 4–6 preferably includes a plurality of groups 54 of circumferentially abutting flat iron elements 50 extending radially outwardly from a common centerline axis 56 to collectively define a radially inner bore 58 having a common inner diameter $D_i$, and a radially outer perimeter 60 having a common outer diameter $D_o$. A plurality of the wedges 52 are interposed between respective ones of the groups 54 as shown in FIG. 5. A suitable number of the elements 50 are disposed in each of the groups 54, and the groups 54 and interposed wedges 52 are preferably configured in a plurality of arcuate sectors 62, with the elements 50 and wedges 52 of each sector 62 being fixedly joined together by a suitable adhesive or mechanical fasteners as further described hereinbelow. An exemplary one of the sectors 62 is shown in more particularity in FIG. 5, with the sectors 62 illustrated in FIG. 4 being simplified for clarity of presentation, with it being understood that each of the sectors 62 in FIG. 4 is identical in construction to the exemplary sector 62 illustrated in FIG. 5. The completed inner core 48 is a full ring which is interposed between adjacent ones of the inner coils 42 and is effective for channeling magnetic flux through the inner core 48 which is generated by passing electrical current through the inner coils 42. The elements 50 and the wedges 52 have generally identical lateral configurations and abut each other so that the inner coil 48 is a co-planar ring having a continuous inner bore 58 and a continuous perimeter 60 for suitably supporting the inner coil 42 and channeling magnetic flux generated thereby.

Figures 7, 8:
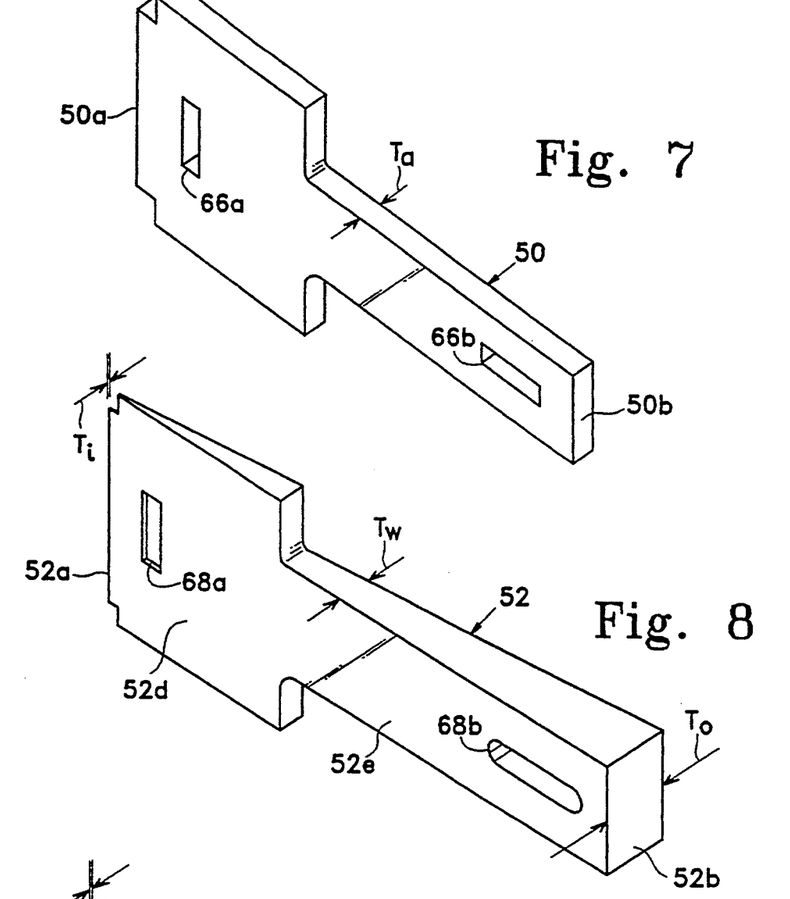
FIG. 7 is a perspective view of one of the laminations contained in the sector shown in FIG. 5.
FIG. 8 is a perspective view of an exemplary solid wedge contained in the sector shown in FIG. 5 in accordance with a first embodiment.

In the preferred embodiment, each of the elements 50 as shown in FIG. 7 is preferably a flat sheet metal component for reducing manufacturing costs as well as reducing eddy current losses and has a substantially constant thickness $T_a$. The plurality of laminations 50 forming each of the groups 52 as illustrated in FIG. 5 abut each other and therefore form a group 54 also having a constant thickness $T_g$ in a circumferential direction from the bore 58 to the perimeter 60, with the group thickness $T_g$ being simply the collective thicknesses of the stacked together laminations 50.

As shown in FIG. 7, each element 50 has a radially inner edge 50a which defines in part the bore 58 illustrated in FIGS. 4 and 5, and also includes a radially outer edge 50b which defines in part the perimeter 60 illustrated in FIGS. 4 and 5.

Referring to FIG. 5, since each of the elements 50 has a constant thickness $T_a$ and each of the groups 54 has a constant thickness $T_g$, the lamination inner edges 50a may abut each other to form a substantially continuous bore 58. However, since the groups 54 extend radially outwardly, the perimeter 60 has a greater circumference than that of the bore 58 and the groups 54 must necessarily spread apart from each other. Since the perimeter 60 of the inner core 48 is disposed adjacent to the inner conduit 20, discontinuities in the magnetic flux path from the so separated groups 54 into the liquid metal being carried through the flow channel 16 will occur but for the use of the wedges 52 in accordance with the present invention.

As illustrated in more particularity in FIG. 8, each of the wedges 52 includes a radially inner edge 52a having a thickness $T_i$, and a radially outer edge 52b having a thickness $T_o$, with the outer edge 52b being thicker than the inner edge 52a, i.e. $T_o$ being greater than $T_i$, so that the wedge outer edges 52b abut adjacent ones of the groups 54 to provide a continuous and uninterrupted path around the perimeter 60. The elements 50 are preferably formed of conventional magnetic iron and, therefore, the continuous perimeter 60 provides a continuous path for the magnetic flux generated by the inner coils 42. The elements 50 may also be non-magnetic, such as being formed of stainless steel, and are therefore useful for uniformly spacing apart the groups 54 to provide uniformly circumferentially spaced apart magnetic flux paths therethrough.

As illustrated in FIG. 5, each of the wedges 52 is preferably configured to separate adjacent groups 54 in a generally V-shaped spacing to form an acute angle A between the adjacent groups 54 from the bore 58 to the perimeter 60. In the exemplary embodiment illustrated in FIG. 4, nine sectors 62 of 40° each is illustrated, and as shown in FIG. 5, each of the sectors 62 includes seven exemplary lamination groups 54 equidistantly spaced apart at suitably small acute angles A.

As shown in the exemplary embodiment illustrated in FIG. 8, the wedge 52 may have a thickness $T_w$ increasing continuously and linearly from the wedge inner edge 52a to the wedge outer edge 52b. Also in the embodiment illustrated in FIG. 8, the wedge 52 is substantially solid and may be conventionally machined to this tapered configuration, However, machining costs are relatively high to form such a tapered wedge 52 illustrated in FIG. 8, and the eddy current losses from a magnetic-material wedge 52 are also relatively high in view of the solid thickness thereof.

Figure 9:
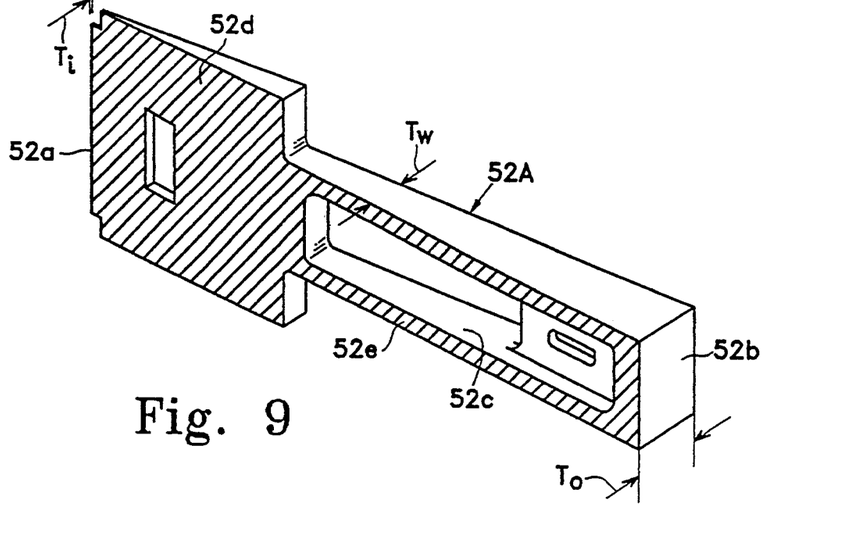
FIG. 9 is a perspective view of an exemplary hollow wedge in accordance with a second embodiment for use in the sector shown in FIG. 5.

Accordingly, FIG. 9 illustrates a second embodiment of the wedge 52 designated 52A which also has a tapered thickness $T_w$ from the inner edge 52a to the outer edge 52b, but has a recessed and hollow center portion 52c which extends in part completely through the wedge 52A for reducing the average thickness of the wedge 52a which will therefore decrease eddy current losses therein. The wedge 52A is preferably a one-piece casting or powder metallurgy part made conventionally, which is finish machined to final dimensions as required.

In the various embodiments of the wedges disclosed herein, the wedges are preferably key-shaped with a generally square back 52d adjacent the inner edge 52a, and an elongate, rectangular shank or tooth portion 52e extending therefrom to the outer edge 52b. In the embodiment of the wedge 52A illustrated in FIG. 9, the wedge shank 52e includes the hollow and recessed central portion 52c since it is the thicker portion of the wedge 52A, with the back 52d being thinner.

Figure 10:
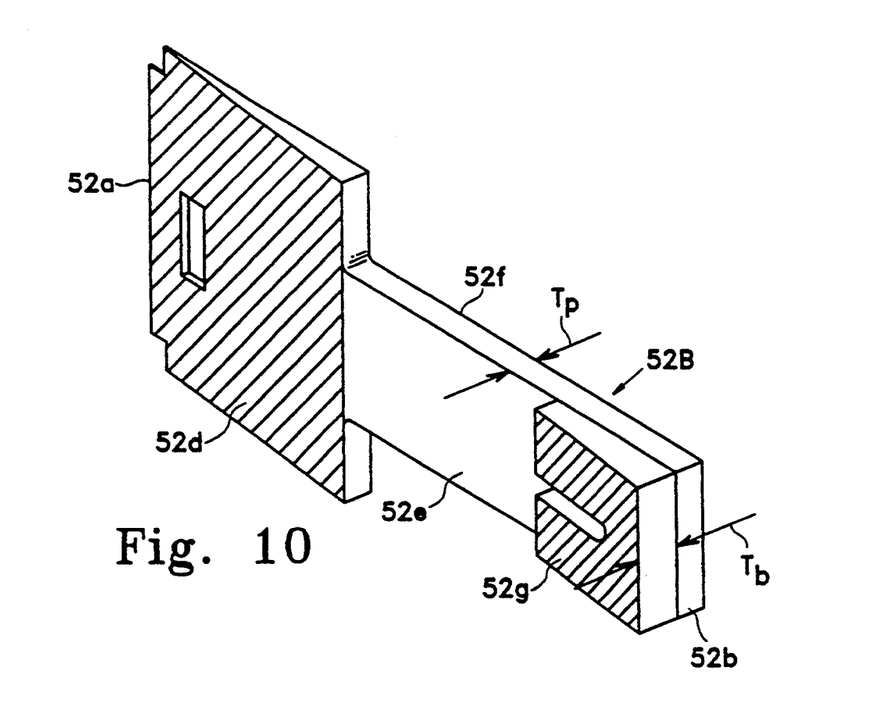
FIG. 10 is a perspective view of an exemplary two-component wedge in accordance with a third embodiment for use in the sector shown in FIG. 5.
Figure 11:
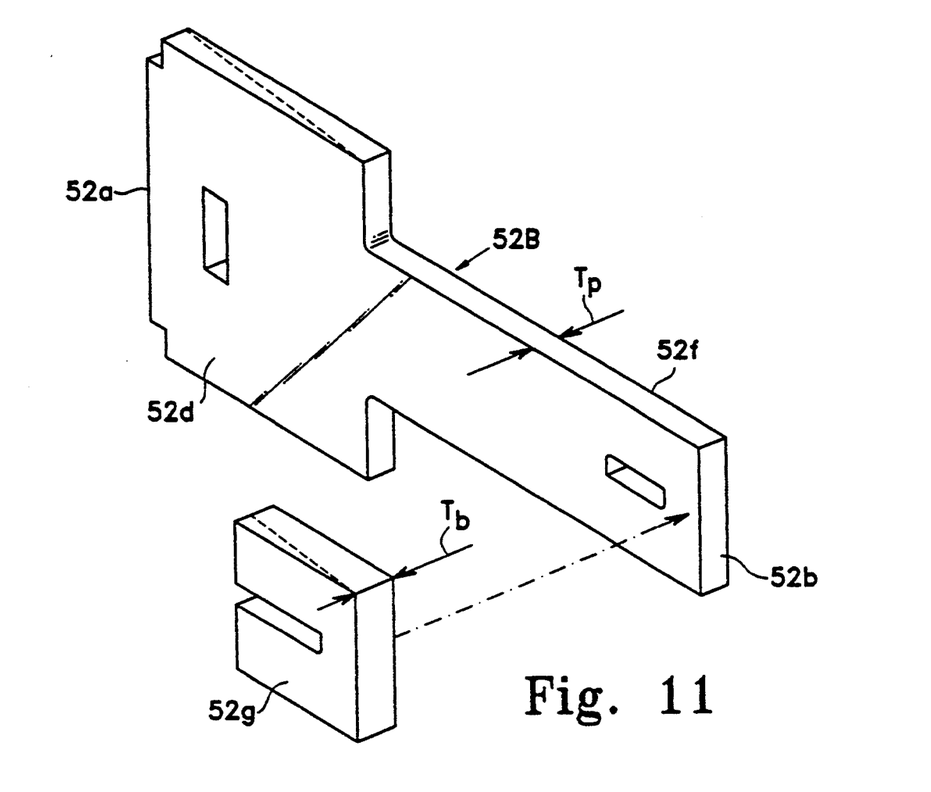
FIG. 11 is an exploded view of the two-component wedge illustrated in FIG. 10 prior to assembly thereof and prior to final machining to taper the wedge.

The wedge 52A illustrated in FIG. 9 requires finish machining on both of its side surfaces as represented schematically by the hatching on one of the surfaces, and the wedge 52 illustrated in FIG. 8 similarly requires such finish machining. In order to decrease the amount of machining required and to use less material to fabricate the wedges 52, FIGS. 10 and 11 illustrate a third embodiment of the wedge 52 designated 52B which is a two-component assembly. As shown in FIG. 11, the wedge 52B includes a sole plate 52f extending from the inner edge 52a to the outer edge 52b, and a heel block 52g suitably fixedly joined to the sole plate 52f at the outer edge 52b. The sole plate 52f initially has a constant thickness $T_p$, and the heel block 52g also initially has a constant thickness $T_b$ and is thicker than the sole plate 52f. In this embodiment, the sole plate 52f is key-shaped as shown in FIG. 10 with the square back 52d being adjacent to the inner edge 52a, and the shank elongate 52e extending therefrom to the outer edge 52b. The heel block 52g is conventionally fixedly joined to the shank 52e at the outer edge 52b and is preferably coextensive therewith to have a similar outer profile.

In the embodiment illustrated in FIGS. 10 and 11, the heel block 52g is tapered by suitable machining and has a decreasing thickness from the outer edge 52b toward the inner edge 52a. Similarly, the back 52d is completely tapered by suitable machining and has an increasing thickness from the inner edge 52a toward the outer edge 52b. The dashed lines in FIG. 11 illustrate the portions of the heel block 52g and the back 52d which are machined away to form the tapered wedge assembly 52b illustrated in FIG. 10, with the cross-hatching indicating schematically the machining of these two surfaces which is preferably done along a common plane. This machining is preferably done on one face only of the wedge 52B to reduce the amount of machining required. For a magnetic or iron formed wedge 52B, eddy current losses would be reduced over those found in the solid wedge 52 illustrated in FIG. 8 since the wedge 52B has a smaller average thickness.

Figure 12:
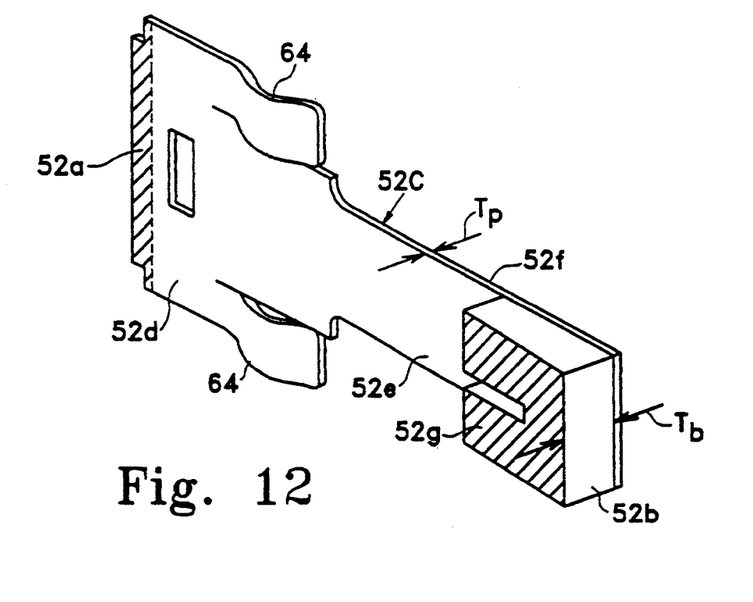
FIG. 12 is a perspective view of an exemplary two-component wedge in accordance with a fourth embodiment for use in the sector shown in FIG. 5.
Figure 13:
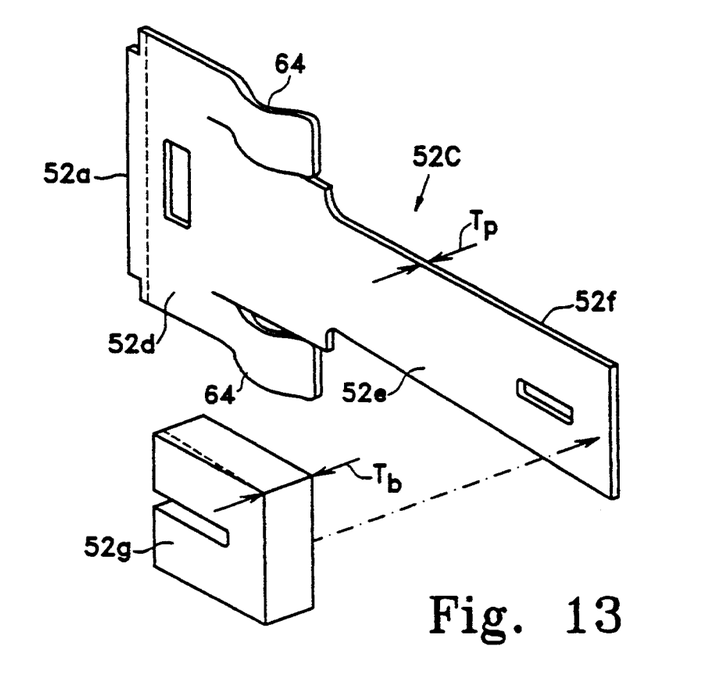
FIG. 13 is an exploded view of the two-component wedge illustrated in FIG. 12 prior to assembly thereof and prior to machining to taper the wedge.

Machining and eddy current losses may further be reduced in a fourth embodiment of the wedge 52, designated 52C illustrated in FIGS. 12 and 13. In this embodiment, the sole plate 52f is preferably sheet metal having a constant thickness $T_p$, and the back 52d includes a pair of cantilevered leaf springs 64 extending from the back 52d toward the heel block 52g on opposite sides of the shank 52e. The leaf springs 64 may be simply formed by slitting the back 52d from its radially outer end and partially inwardly toward the inner edge 52a and then forming generally S-shaped bends therein for defining the springs 64. The springs 64 are configured for abutting contact with the adjacent lamination groups 54 when assembled into the individual sectors 62.

The heel block 52g may be fixedly joined to the sole plate 52f by conventional furnace brazing, riveting, screws, or adhesives as desired, which applies also to the FIG. 10-11 embodiment. Since the sole plate 52f in this embodiment is preferably sheet metal, it is thinner than the sole plate illustrated in FIGS. 10 and 11 and, therefore requires that the heel block 52g be thicker than the corresponding block in FIGS. 10 and 11. However, the average thickness of the wedge 52C illustrated in FIG. 12 is substantially less than that of the solid wedge 52 illustrated in FIG. 8, and less than the wedge 52B illustrated in FIG. 10, for further reducing eddy current losses where the wedge 52C is formed of magnetic iron material. The wedge 52C illustrated in FIGS. 12 and 13 requires less finish machining than the wedge 52B illustrated in FIGS. 10 and 11 since only one side of the heel block 52g requires machining along with a relatively small portion of the back 52 adjacent the inner edge 52a as shown in dashed line in FIG. 13 and represented schematically by the hatching in FIG. 12.

As illustrated for example in FIGS. 7 and 8, each of the elements 50 has radially inner and outer holes 66a, 66b adjacent to the respective inner and outer edges 50a, 50b thereof, and each of the wedges 52 includes inner and outer holes 68a, 68b adjacent to the respective inner and outer edges 52a, 52b thereof. A pair of tie rods 70 as shown generally in FIG. 5 extend through respective ones of the inner and outer holes through the sector 62 to fixedly join together the elements group 54 and the wedges 52 in each of the sectors 62. Also as shown in FIG. 5, each sector 62 may have two end plates 72 which may be substantially identical in configuration to the interposed wedges 52 for allowing the tie rods 70 to sandwich and clamp together the element groups 54 and the wedges 52.

Figure 14A:
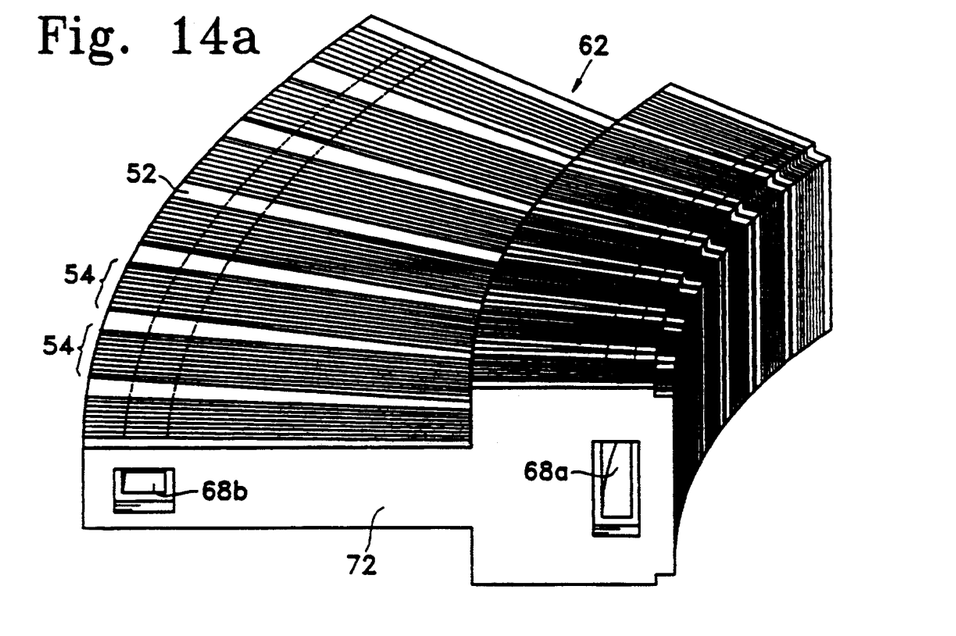
FIG. 14a is a perspective view of one of the sectors of the core illustrated in FIG. 4 having inner and outer holes for receiving a pair of tie rods for fixedly joining together the laminations and wedges of the sector, with exemplary tie rods being illustrated in FIGS. 14b through 14g.

Suitable forms of the tie rods 70 or mechanical fasteners to clamp together the individual sectors 62 are shown in FIGS. 14b through 14g for extending through the respective holes 66a,b and 68a,b passing through each element at a common location as shown in FIG. 14a. The inner holes 66a and 68a as illustrated in FIGS. 7, 8, and 14a are preferably elongate slots oriented with their narrowest dimension being perpendicular to the magnetic flux path. More specifically, the inner holes 66a and 68a have their longer dimension extending parallel to the centerline axis 56 (see FIG. 4) of the completed inner core 48, with the narrower dimension being disposed radially or perpendicularly to the centerline axis 56. However, the outer holes 66b and 68b have their longer dimension extending radially or perpendicularly to the centerline axis 56, with their narrower dimension extending parallel to the centerline axis 56. In this way, the tie rods 70 will have minimal adverse effect on the magnetic flux path through the inner core 48.

Figure 14B:
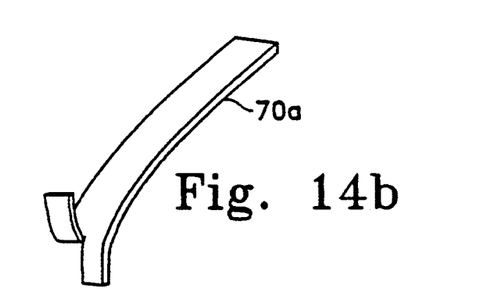
Figure 14C:
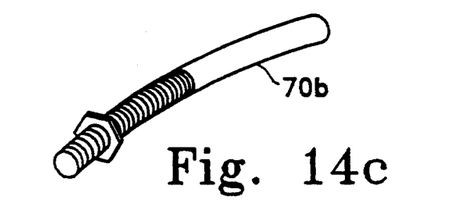
Figure 14D:
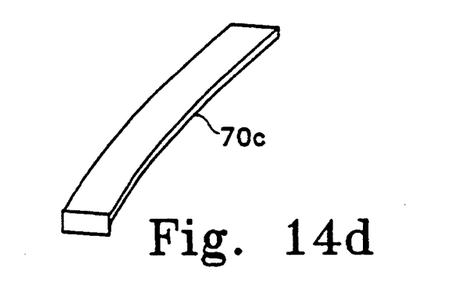
Figure 14E:
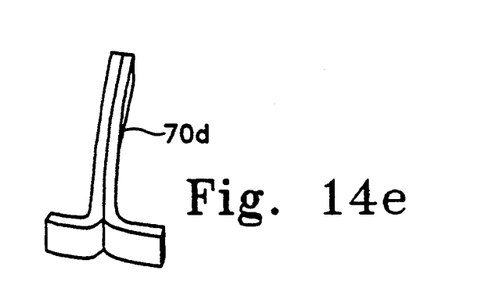
Figure 14F:
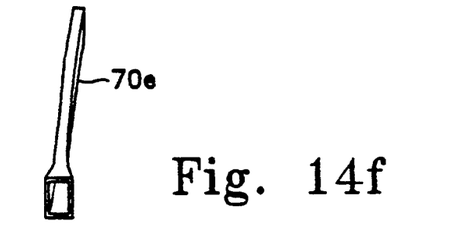
Figure 14G:
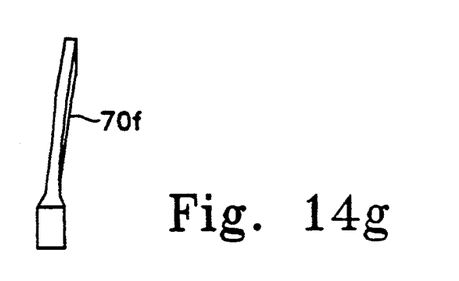

The tie rods 70 may take any suitable form including a first embodiment of the tie rod 70, designated 70a and shown in FIG. 14b, having a solid rectangular cross section and split and bent aft ends to fasten the first tie rod 70a in the sector 62. FIG. 14c illustrates a second tie rod 70b which is a solid circular bar threaded at both ends and using nuts to fasten each sector 62 together. FIG. 14d illustrates a third tie rod 70c wherein its opposite ends may be welded flush to the end plates 72. FIG. 14e illustrates a fourth tie rod 70d formed in two coextensive solid rectangular parts wherein the opposite ends thereof are separately bent for fastening the tie rod 70d in the sector 62. FIG. 14f illustrates a tubular, rectangular fifth tie rod 70e having opposite ends mushroomed, or plastically deformed, for fastening the tie rod 70e in the sector 62. And, FIG. 14g illustrates a solid, rectangular sixth tie rod 70f having opposite ends which again are mushroomed or plastically deformed to fasten the tie rod 70f in the sector 62.

The various embodiments of the tie rods 70 may be used as desired in either the inner or outer holes through the sectors 62 where mechanical fastening is desired to rigidly clamp together the element groups 54 and the wedges 52. In alternate embodiments, the inner and outer holes 66, 68 may be eliminated, and the elements 50 and wedges 52 may be suitably and conventionally bonded together using an adhesive.

Figure 15:
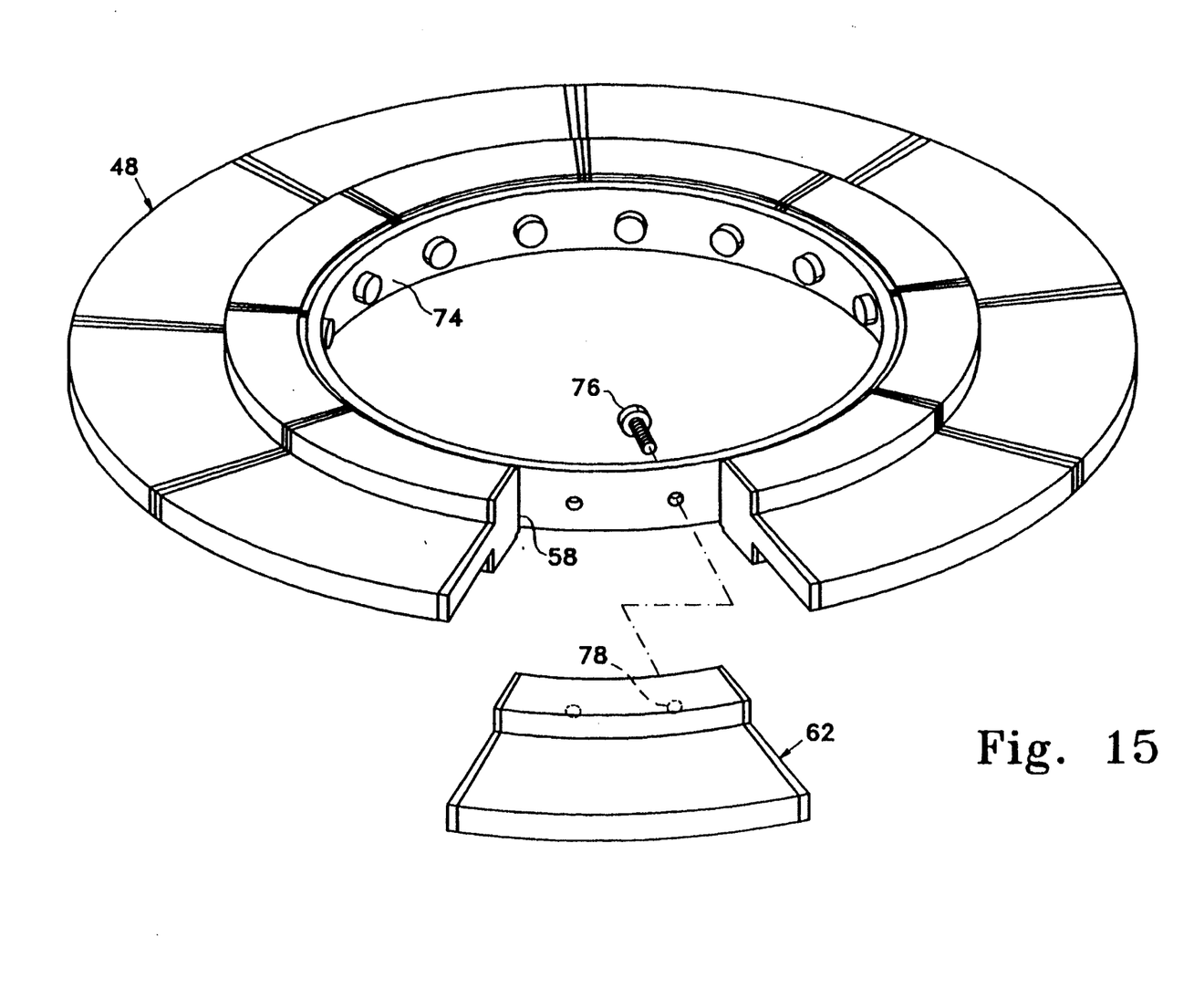
FIG. 15 is a partially exploded view of a second embodiment of the core shown in FIG. 4 illustrating bolting of the individual sectors to an alignment ring.

To mitigate against possible damage due to vibrations, it is highly desirable to clamp the stator sectors 62 together in a continuous ring to form the inner core 48. For the inner stators 40, this function can be provided by pulling the iron of each element unit up against the outside diameter of an inner alignment ring 74 as shown in FIG. 15. This may be accomplished with radially oriented bolts 76 extending from the inside diameter of the alignment ring 74 into tapped holes 78 in the package of iron elements or sectors 62. The alignment ring 74 thus becomes an integral part of the inner stator lamination core 48 assembly.

Accordingly, the alignment ring 74 is disposed coaxially in the bore 58, with the bolts 76 extending radially outwardly through the ring 74 and threadingly into the sectors 62 for fixedly joining the sectors 62 to the ring 74. The last sector 62 as shown in FIG. 15, which is also an arcuate section, may be sized with preferred manufacturing tolerances so that as the bolts 76 draw the sector 62 radially inwardly, the last sector 62 is wedged between the adjacent sectors 62 to provide a clamping force around the circumference of the inner core 48.

To maximize the thermal expansion of the inner stator 40, the alignment ring 74 is made of a high thermal expansion alloy, such as 304 or 316 stainless steel. Thus, the expansion rate of the inner core 40 is a composite of the expansion rates of the alignment ring 74, elements 50, and wedges 52. In combination with higher operating temperatures, the composite expansion rate is sufficient to assure that the inner stator core 48 will experience comparable thermal growth to the inner flow conduit 20. Thus, the inner core-to-flow conduit gap and inner stator temperatures are minimized. Furthermore, with the use of a shrink fit at assembly, the inner flow conduit 20 will function as a significant band clamp for the complete inner stator 40.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A stator core for supporting an electrical coil and channeling magnetic flux therefrom comprising:
   a plurality of groups of circumferentially abutting flat elements extending radially outwardly from a common centerline axis to collectively define a radially inner bore and a radially outer perimeter; and
   a plurality of wedges interposed between said groups, each wedge having a radially inner edge, and a radially outer edge being thicker than said inner edge, with said outer edges abutting adjacent ones of said groups to provide a continuous path around said perimeter.

2. A core according to claim 1 wherein each of said elements has a constant thickness, and each of said groups has a constant thickness.

3. A core according to claim 2 wherein each of said wedges is configured to separate said groups to form an acute angle between adjacent ones of said groups from said bore to said perimeter.

4. A core according to claim 3 wherein said groups and interposed wedges are configured in a plurality of arcuate sectors, with said elements and wedges of each sector being fixedly joined together.

5. A core according to claim 4 wherein thickness of said wedges increases continuously and linearly from said inner edge to said outer edge.

6. A core according to claim 5 wherein said wedge is substantially solid.

7. A core according to claim 5 wherein said wedge is key-shaped with a generally square back adjacent said inner edge and an elongate shank extending therefrom to said outer edge, said wedge shank having a hollow and recessed central portion.

8. A core according to claim 4 wherein said wedge comprises:
   a sole plate extending from said inner edge to said outer edge; and
   a heel block fixedly joined to said sole plate at said outer edge, said heel block being thicker than said sole plate.

9. A core according to claim 8 wherein said sole plate is key-shaped with a generally square back adjacent said inner edge, and an elongate shank extending therefrom to said outer edge, and said heel block is fixedly joined to said shank at said outer edge and is coextensive therewith.

10. A core according to claim 9 wherein said heel block is tapered and has a decreasing thickness from said outer edge toward said inner edge.

11. A core according to claim 10 wherein said back is completely tapered and has an increasing thickness from said inner edge toward said outer edge.

12. A core according to claim 10 wherein said sole plate is sheet metal having a constant thickness, and said back includes a pair of cantilevered leaf springs extending from said back toward said heel block on opposite sides of said shank in abutting contact with adjacent one of said groups.

13. A core according to claim 4 wherein said laminations and said wedges have radially inner and outer holes adjacent said inner and outer edges, respectively; and further comprising a pair of tie rods, each extending through respective ones of said inner and outer holes to fixedly join together said laminations and said wedges in each of said sectors.

14. A core according to claim 13 further comprising an alignment ring disposed coaxially in said bore, and a plurality of bolts extending radially outwardly through said ring and threadingly into said sectors for fixedly joining said sectors to said ring.

* * * * *